May 28, 1957 J. P. FRAIN ET AL 2,793,656
RELIEF VALVE
Filed Sept. 29, 1953
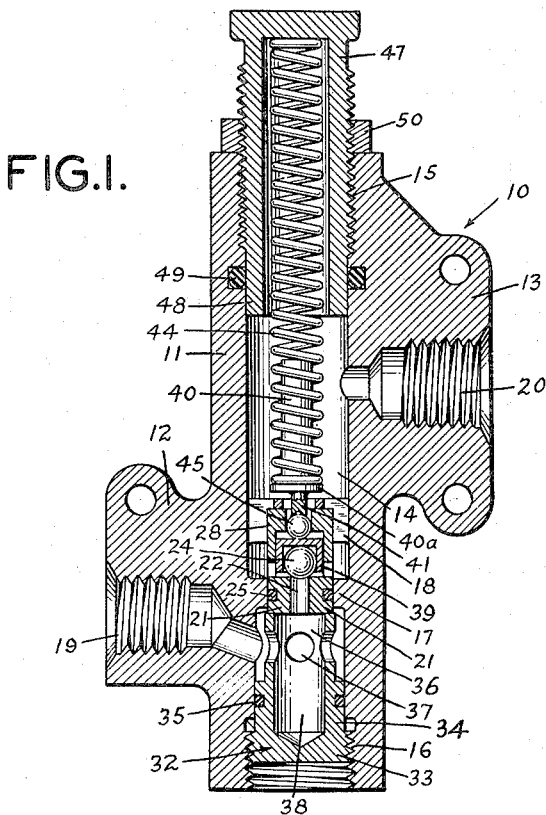
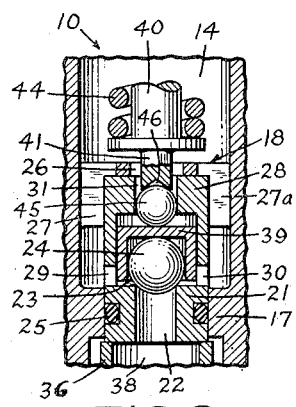
FIG.2.
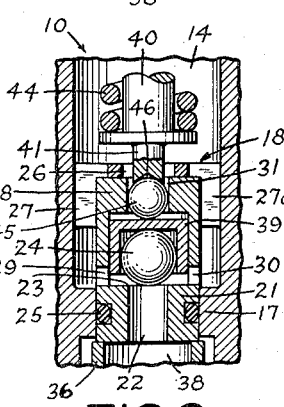
FIG.3.
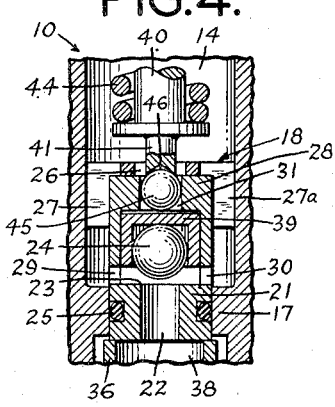
FIG.4.
INVENTORS.
JOHN P. FRAIN
FRANK TWOHIG
BY
THEIR ATTORNEYS.

United States Patent Office
2,793,656
Patented May 28, 1957

2,793,656

RELIEF VALVE

John P. Frain, Kingston, and Frank Twohig, Eddyville, N. Y., assignors to Electrol Incorporated, Kingston, N. Y., a corporation of Delaware Application September 29, 1953, Serial No. 383,068

2 Claims. (Cl. 137—469)

This invention relates to improvements in pressure relief valves and check valves, and it relates particularly to an improved form of relief or check valve having means for dampening the action of the valve to reduce chattering and for assuring proper opening and closing of the valve.

Relief or check valves have been constructed heretofore in such a manner that a pressure sufficient to unseat the valve member will exert a greater force on the valve member after it has opened so that the valve will move to fully open position under conditions of pressure and fluid velocity just sufficient to unseat the valve member. The valve will not close until the fluid pressure drops substantially below that which is required to open the valve.

Such valve may also include a dampening means for suppressing vibration of the valve member of the valve to eliminate the tendency of the valve member to chatter under certain pressure conditions. Valves of the type referred to above, and particularly those having the dampening means thereon, have one practical disadvantage. The valves are normally spring biased to a closed position and include a plunger which bears against the valve element and urges it to a closed position. The plunger is biased by means of a helical spring which has a tendency to cant or tilt the plunger with the result that it sometimes sticks to the guideway therefor and allows the valve to remain open even when the fluid pressure acting on the valve has dropped below a desired minimum value.

The present invention involves an improved type of pressure and relief valve of the check valve type which opens when subjected to a predetermined pressure and closes positively when the pressure drops to a predetermined value substantially below the pressure required to open the valve. Such a valve is of particular utility in the regulation and control of the pressure in a hydraulic system wherein the fluid pressure must be maintained within definite operating limits. The new valve is provided with a dampening means for suppressing chattering or vibration of the valve during operation and it further includes means which effectively overcomes any tendency of the valve to stick and refuse to close when the pressure of the fluid drops to a value low enough to cause the valve to close normally.

For a better understanding of the present invention, reference may be had to the accompanying drawing in which:

Fig. 1 is a view in longitudinal section through a typical form of pressure relief and check valve of the type embodying the present invention; and Figs. 2, 3 and 4 are views in longitudinal section through the cage, retainer and valve components of the device in various positions illustrating the operation of the valve.

Referring now to Fig. 1 of the drawing, the valve 10 chosen for the purposes of illustration may include an elongated generally cylindrical casing 11 having laterally directed bosses 12 and 13 on opposite sides thereof spaced lengthwise of the casing. The casing 11 is provided with a longitudinally extending bore or passage 14 having internally threaded portions 15 and 16 at its opposite ends, an annular flange 17 above the threaded end 16 of the bore and a spider 18 spaced slightly from the flange 17.

The boss 12 is provided with an internally threaded inlet port 19 which communicates with the passage 14 below the flange 17, as viewed in Fig. 1.

The boss 13 has an internally threaded outlet port 20 communicating with the passage 14 on the opposite side of the flange 17 and spider 18 from the inlet port 19.

The flange 17 centers an annular valve seat ring 21 in the bore, the ring 21 having a central fluid passage 22 at the upper end of which is an annular sharp edge 23 forming the seat for a ball valve member 24. The ring 21 is sealed to the flange 17 by means of a suitable sealing ring 25. The ring 21 is slidable in the flange 17 and is retained in position as described hereinafter.

The spider 18 may consist of a partition formed across the passage 14 which is provided with a central aperture 26 and a series of radially disposed apertures 27 and 27a permitting flow of liquid through the spider. The spider is counterbored on its undersurface to receive a retainer 28 which is of a generally inverted cup shape and has a series of notches 29 and 30 in its lower edge forming liquid passages. The retainer 28 also has a centrally located opening 31 in its top.

The retainer 28 and the valve seat ring 21 have their adjacent edges in engagement. The top of the retainer engages in the counterbore of the spider 18 and is thereby retained against upward movement. Inasmuch as the valve seat ring 21 engages the edge of the retainer 28, the ring 21 is held against upward movement.

The retainer 28 and the ring 21 are retained in fixed position by means of a plug 32 which has an enlarged end portion 33 threaded into the threaded portion 16 of the valve casing and a hollow cylindrical portion 34 of smaller diameter extending lengthwise of the passage 14.

A sealing ring 35 is carried by the cylindrical portion 34 of the plug and bears against the wall around the bore 14 to prevent leakage of fluid past it. The plug also has a sleeve portion 36 of a smaller external diameter than the passage 14. The sleeve portion 36 bears against the lower end of the valve seat ring 21 and thereby holds it in engagement with the retainer 28 and the latter in firm engagement with the spider 18.

The reduced sleeve 36 is provided with a plurality of openings 37 to permit fluid to flow from the inlet port 19 into the central bore 38 of the plug 32 and through the passage 22 of the valve seat ring 21.

The ball valve 24 is mounted in a cup-shaped cage 39, the latter being slidably received within the retainer 28. The ball 24 extends below the edge of the cage for engagement with the valve seat 23. The cage 39 is guided by the retainer 28 but is not in liquid-tight relation thereto.

The ball valve 24 and the cage 39 are normally urged toward the valve seat 21 to seat the ball against the valve seat 23. The mechanism for producing this action includes a plunger 40 having a stem 41 which extends through the opening in the spider 18 and into the opening 31 in the retainer 28. The stem is received loosely in the opening 31 to prevent it from jamming, if the stem should be canted or tilted by the spring 44 which urges the stem 40 axially toward the valve seat 23.

To overcome further the tendency of the stem 41 to bind or jam, a ball 45 is interposed between the end of the stem 41 and the cage 39. The ball fits closely within the opening 31 to restrict the flow of liquid through the opening 31. The stem 41 is centered with respect to the ball 45 by means of a conical recess 46 in the end of the stem which allows it to shift but, in general, remains centered on the ball. Inasmuch as the stem 41 is completely out of engagement with the spider 18, and does not engage the sides of the retainer around the opening 31, even substantial tilting or canting of the plunger 40 and the stem 41 thereon, will not cause the stem to jam. Moreover, the low frictional engagement between the end of the stem 41 and the ball 45 permits limited relative movement without in any way causing the ball 45 to jam in the opening 31.

The plunger 40 also includes a disc-like flange member 40a thereon against which the spring 44 bears. The plunger 40 is guided in the spring, at least in part, by engagement in the lower end of the spring.

The upper end of the spring is engaged by means of an externally threaded closure and adjusting plug 47 which is threaded into the threaded portion 15 of the valve casing and can be adjusted axially of the passage 14 to vary the pressure exerted by the spring 44 on the ball valve member 24. The inner end 48 of the adjusting member 47 is cylindrical and fits within the passage 14 in liquid-tight engagement with a sealing ring 49 mounted in a groove in the wall of the casing 11.

The upper end of the adjusting member 47 may be hexagonal or other non-circular shape, or slotted or recessed to receive a wrench or screw driver for adjusting the tension of the spring. The member 47 is retained in adjusted position by means of a lock nut 50 which may be turned up against the end of the valve casing 11.

Referring now to Figs. 2, 3 and 4, Fig. 2 illustrates the valve in a closed position; Fig. 3 illustrates the valve as it is beginning to open; and Fig. 4 shows the valve in substantially fully open position. As shown in Fig. 2, when the fluid pressure at the inlet port 19 is insufficient to displace the ball 24 from its seat 23, the plunger 40 and the spring 44 urge the cage 39 and the ball 24 in it downwardly so that the ball engages the seat 23. As the pressure increases, it lifts the ball slightly from the seat, as shown in Fig. 2. When this occurs, the fluid escaping through the passage 22 past the ball will act not only on the larger surface area of the ball but also on the exposed edges of the cage 39. As a result, the velocity of the fluid escaping past the ball and the pressure exerted on the increased available area of the ball and cage lifts the ball, its cage 39, the ball 45 and the plunger 40 to the fully open position, as shown in Fig. 4 so that the liquid may escape with high velocity.

The cage 39 and the retainer 28 act to dampen the action of the valve. As explained above, the cage 39 is not in sealing engagement with the retainer 28, and likewise, the ball 45 is not in liquid-tight relation to the retainer 28. The liquid can flow slowly out of or into the retainer 28 behind the cage 39 and thereby prevents rapid movement of the ball 24 relative to the seat 23. The clearances between the cage 39, retainer 28, the ball 45 and the opening 31, therefore, act like metering ports in a hydraulic dampener, precluding rapid motion of the ball valve 24 and eliminating chatter of the valve against its seat.

The presence of the ball member 45 permits and assures free movement of the cage 39 and the actuating stem 41 so that binding of the device, despite limited canting or tilting of the plunger 40 is completely avoided.

It will be understood from the preceding description that valves of the type embodying the present invention are responsive to changes in fluid pressure but are so dampened in their action that rapid vibration of the valve member is prevented. Nevertheless, when the pressure attains a value sufficient to unseat the valve member, it will open to its full extent allowing a very rapid discharge of liquid through the open valve without any danger of the valve slapping or chattering.

It will be understood further that the valve is susceptible to considerable variation in its size, shape and in the positioning of the ports relative to the check valve and dampening mechanism proper, and therefore the form of the invention disclosed herein should be considered as illustrative and not as limiting the scope of the following claims.

We claim:

1. A pressure relief valve comprising a casing having an inlet and an outlet and a passage therein, a spider member fixed in said casing in said passage between said inlet and said outlet, a cup-shaped retainer in said passage having a base engaging said spider and a cylindrical rim portion having a notched edge spaced from said spider member, said retainer being of substantially smaller diameter than said passage and having an opening in its base, an annular valve seat member in said passage abutting and substantially coaxial with said notched rim of said retainer, a positioning sleeve in said casing engaging said valve seat member and holding it against said retainer and the latter fixedly against said spider, a valve member in said passage having a piston-like portion mounted on it in sliding engagement with said retainer, a plunger movable axially of said passage and having an end portion extending loosely through the opening in said retainer, a ball guided in the opening in said retainer and interposed between said plunger and said piston-like portion and a spring engaging said plunger and urging it, said ball, said piston-like portion and said valve member toward said seat member.

2. A pressure regulating valve comprising a valve casing having an inlet and an outlet and a passage connecting them, an annular valve seat in said passage, a valve member in said passage movable into engagement with said seat to prevent flow of fluid from said inlet to said outlet and movable out of engagement with said seat by fluid pressure at said inlet to enable liquid to flow through said passage from said inlet to said outlet, a cup-shaped retainer mounted in said passage adjacent to said seat and having a bottom and a side wall, said side wall having at least one substantially radial port therein communicating with said valve seat and the passage outside said retainer, said bottom having an opening substantially in axial alignment with said seat, said valve member being slidably mounted in said retainer and movable therein into and out of engagement with said valve seat and at least partially uncovering said port when out of engagement with said seat to allow flow of fluid along said passage from said inlet to said outlet, a ball member loosely mounted in said opening for engagement with said valve member and providing a metering port communicating with said passage through which fluid can flow to and from a chamber formed between the bottom of said retainer and said valve member, and a spring biased plunger in said casing having an end portion of smaller cross-section than said opening extending therethrough into engagement with said ball member for urging the latter and the valve member toward said valve seat.

References Cited in the file of this patent

UNITED STATES PATENTS

| | | |
|---|---|---|
| 1,836,416 | Weber | Dec. 15, 1931 |
| 2,568,026 | Pigott | Sept. 18, 1951 |
| 2,622,613 | McNeal | Dec. 23, 1952 |